No. 640,239. Patented Jan. 2, 1900.
C. TANNER.
CULTIVATOR.
(Application filed Apr. 17, 1899.)
(No Model.) 2 Sheets—Sheet 2.
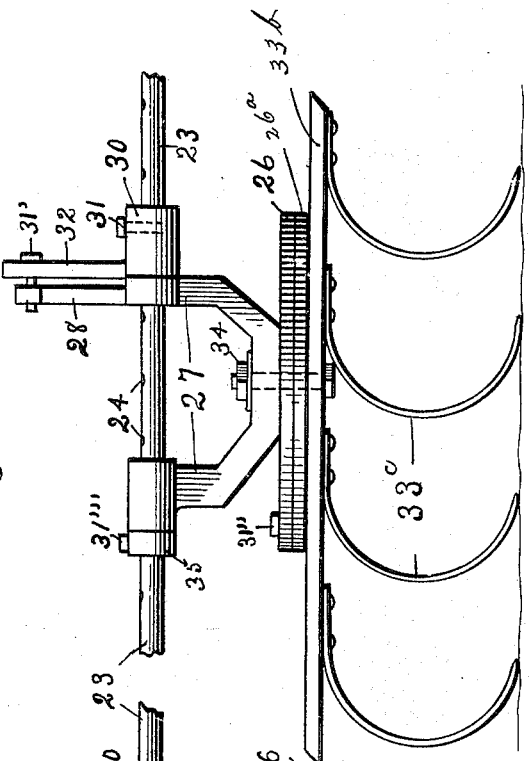
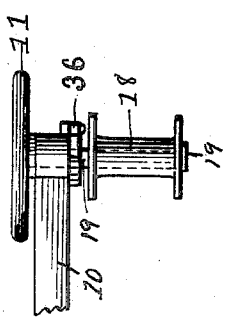
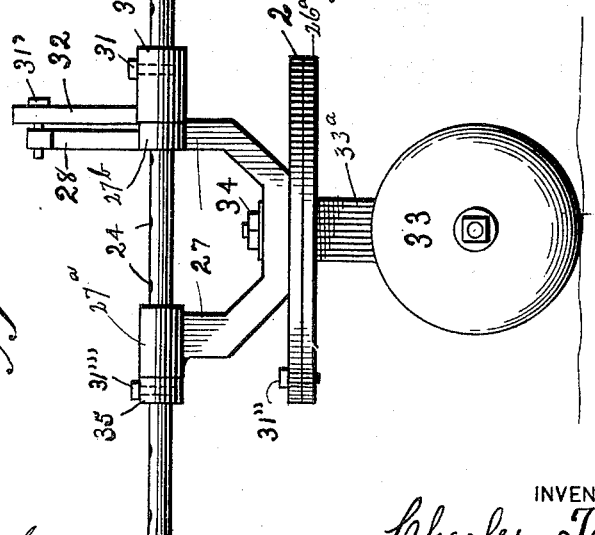
WITNESSES:
William F. Richards.
Emilie Oster.
INVENTOR
Charles Tanner.
BY
Semer G. Wells,
ATTORNEY.

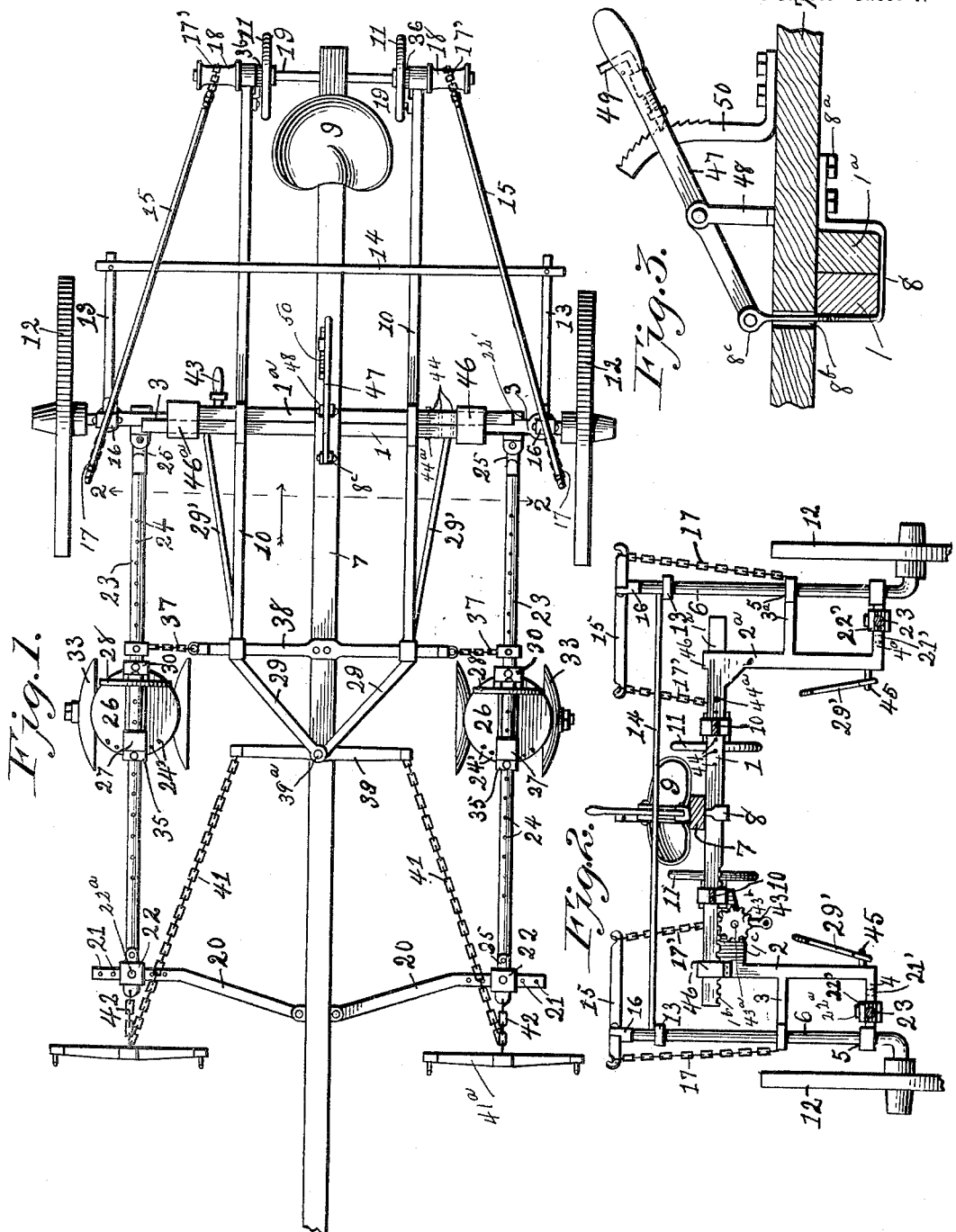

UNITED STATES PATENT OFFICE.

CHARLES TANNER, OF CHENEYVILLE, LOUISIANA.

CULTIVATOR.

SPECIFICATION forming part of Letters Patent No. 640,239, dated January 2, 1900.

Application filed April 17, 1899. Serial No. 713,283. (No model.)

*To all whom it may concern:*

Be it known that I, CHARLES TANNER, a citizen of the United States, residing at Cheneyville, in the parish of Rapides and State of Louisiana, have invented new and useful Improvements in Cultivators, of which the following is a specification.

My object is to construct a cultivator suitable for use in preparing soil for planting and in cultivating the growing crops; and in the construction of such a cultivator my object is to provide means of readily regulating the depth, distance apart, and angle of the cultivating-disks, as required to suit the needs of the soil and crop, and also to provide means for adjusting the means between the traction-wheels by the driver easily and quickly.

My invention consists of the features herein shown, described, and claimed.

Figure 1 is a top plan view of the cultivator constructed in accordance with the principles of my invention. Fig. 2 is a cross-section taken approximately on the line 2 2 of Fig. 1 and looking in the direction indicated by the arrow. Fig. 3 is an enlarged detail, partly in section, showing the means of clamping the tongue to the arch-bars. Fig. 4 is a top plan view of one of the end wheels whereby the frame is raised and lowered, the connecting parts being broken away to economize space. Fig. 5 is a side elevation showing disk, working tools, and the connecting parts. Fig. 6 is a view analogous to Fig. 5, showing harrow-teeth substituted for the disk.

The arch-bar consists of the two cross-bars 1 and $1^a$, placed side by side, the cross-bar 1 having gear-teeth $1^b$ in the lower edge of its free end; the posts 2 and $2^a$, extending downwardly from the cross-bars 1 and $1^a$, respectively; the horizontal arms 3 and $3^a$, extending outwardly from the centers of the posts 2 and $2^a$, respectively; the horizontal arms 4 and $4^a$, extending outwardly from the lower ends of the posts 2 and $2^a$, respectively, in alinement with the arms 3 and $3^a$, respectively; the bars 5 in the outer ends of the arms 3 $3^a$ $44^a$; the keepers 46 and $46^a$, extending laterally from the upper ends of the posts 2 and $2^a$, respectively; the pin $44^a$, inserted through the openings 44 in the cross-bars 1 and $1^a$, and the bearing $1^c$, extending downwardly from the cross-bar $1^a$. The sliding standards 6 operate vertically from the bars 5, the lower ends of said standards being turned outwardly to form axles for the wheel 12. The tongue 7 rests upon the center of the arch-bar and is secured to the arch-bar by means of the clamp 8. The clamp 8 is a flexible strap or bar of iron having its rear end attached to the under side of the tongue 7 by means of the bolts $8^a$, said strap passing forwardly under the arch-bar and then upwardly through the opening $8^b$ in the tongue 7 and having an eye $8^c$ at its upper end above the tongue. The post 48 extends upwardly from the tongue 7, and the lever 47 is pivotally connected to the upper end of said post and to the eye $8^c$. The handle end of the lever 47 carries the spring-dog 49 in engagement with the rack-bar 50, which extends upwardly from the tongue back of the post 48. The seat 9 is secured to the rear end of the tongue 7. The cross-bar 1 slides through the keeper $46^a$, and the cross-bar $1^a$ slides through the keeper $46^a$. A shaft $43^a$ is mounted in the bearing $1^c$. A crank 43 is attached to the rear end of said shaft for operating the same, and a pinion $43^b$ is fixed upon the forward end of said shaft in engagement with the teeth $1^b$. When the pin $44^a$ is removed, the operation of the crank 43 slides the cross-bars 1 and $1^a$ relative to each other, thus moving the wheels 12 to or from each other, and when said wheels have been adjusted to the desired distance the pin $44^a$ is replaced, thus holding the wheels rigidly connected together.

The cross-bar 38 is rigidly secured to the tongue 7 some distance in front of the arch-bar, and the supporting-arms 10 extend backwardly from the ends of the cross-bar 38 over the arch-bar to points beyond the seat 9. Said arms 10 rest upon the arch-bar. The levers 13 are rigidly secured to the upper ends of the sliding standards 6 and extend horizontally backward, the rear ends of said levers being connected by the connecting-rods 14, which are located in front of the seat 9 in position to be manipulated by the driver for the purpose of guiding the wheels 12. The levers 15 are pivotally connected between the lugs 16 upon the upper ends of the sliding standards 6. The chains 17 connect the rear ends of the levers 15 with the spools 18, said spools being mounted upon the shafts 19 of the hand-wheels 11, said shafts being carried by bearings at the rear ends of the arms 10. The chains are wound upon the spools 18 by manipulating the hand-wheels 11, and the pawl-and-ratchet mechanisms 36 hold the spools from unwinding. When the driver manipulates the hand-wheels 11 to wind or unwind the chains upon the spools 18, the arch-bar and the connecting parts are raised or lowered upon the sliding standards 6. The connecting-rods 20 are pivotally attached to the tongue 7 a considerable distance in front of the cross-bar 38, and pin-openings 21 are formed in the outer ends of said connecting-rods. The yoke-clevises 22 are slidingly mounted upon the outer ends of the connecting-rods 20 and are held adjustably in position by means of the pins 22$^a$, inserted downwardly through the yoke-clevises 22 and through the openings 21 in the connecting-rods. The yoke-clevises 22' are slidingly mounted upon the arms 4 and 4$^a$, there being pin-openings 21' through said arms and similar openings through the clevises 22' to receive the pins 22$^a$, as required to adjust the clevises in and out upon the arms 4 and 4$^a$. The shafts 23 have a series of openings 24 and flattened ends 25, and said shafts connect the clevises 22 and 22' and form supports for the working tools 33.

Bearing-blocks 27$^a$ and 27$^b$ are slidingly mounted upon the shafts 23. The set-collar 30 is mounted upon the shaft 23 behind the bearing-block 27$^b$ and held adjustably in position by means of the pin 31, inserted downwardly through the collar into the openings 24. The set-collar 35 is adjustably mounted upon the shaft 23 in front of the bearing-block 27$^a$ and is held adjustably in position by means of the pin 31''', inserted downwardly through the collar into the openings 24. The bearing-blocks 27$^a$ and 27$^b$ are connected by the arm 27, extending downwardly from one bearing-block and then upwardly to the other bearing-block. The segmental arms 28 extend upwardly from the bearings 27$^b$, and the arms 32 extend upwardly from the set-collar 30. There are openings in the upper ends of the arms 32 to receive the pins 31', and there is a series of openings in the segment 28 to receive the pin 31', as required to adjust the arm 27 relative to the vertical line. The plate 26 is placed in a horizontal position against the bottom of the arm 27, and a similar plate 26$^a$ is placed below the plate 26. The bolt 34 is inserted upwardly through the plate 26$^a$, through the plate 26, and through the arm 27. There is a series of openings 24' formed in the disk 26 and one or more registering openings in the disk 26$^a$, and the pin 31'' is inserted downwardly through said openings, as required to adjust one disk relative to the other. The arms 33$^a$ are attached to the disk 26$^a$ and extend downwardly, and the disk cutters 33 are attached to the arms 33$^a$, as shown in Fig. 5. In Fig. 6 a plate 33$^b$ is attached to the disk 26$^a$, and the harrow-teeth 33$^c$ are attached to the plate 33$^b$. The harrow-teeth and the disk cutters are interchangeable, and I call them both "working tools." The doubletree 39 is attached to the tongue 7 a short distance in front of the cross-bar 38 by means of the pin 39$^a$, and braces 29 run from the pin 39$^a$ to the forward ends of the arms 10. The chains 41 run from each end of the doubletree 39 to the singletree 41$^a$, and the chains 42 run from the singletree to the clevises 22. The stay-chains 37 connect the outer ends of the cross-bar 38 with the shafts 23. The braces 29' extend from the forward ends of the arms 10 or from the cross-bar 38 rearwardly and connect to the pins 45, projecting inwardly from the lower ends of the posts 2 and 2$^a$.

The adjustment of the working tools back and forth upon the shafts 23 counterbalances the weight of the driver upon the seat 9. The operation of the hand-wheels 11 raises and lowers the arch-bar and connecting parts. The operation of the crank 43 adjusts the wheels 12 to and from each other. The adjustment of the clevises 22 and 22$^a$ moves the working tools to and from each other. The adjustment of the disk 26$^a$ relative to the disks 23 changes the direction of the axis of the disks 33 relative to the line of travel, and the adjustment of the arms 32 relative to the segment 28 by means of the pin 31' changes the axis of the disks 33 relative to a horizontal line.

The lateral adjustment of the framework permits of its being used to take out the middles of rows, thereby enabling the operator to cultivate the crops and take out the middles with the same implement.

The line of draft being directly from the end of the shafts to which the working tools are secured gives the animals a direct pull without side draft.

It is obvious that changes in the exact construction may be made without in any way departing from the distinguishing features of my invention.

I claim—

1. In a cultivator, two axles slidably connected for lateral adjustment, wheels upon said axles, a frame attached to said axles, shafts extending forwardly from said frame parallel with each other, bearing-blocks rotatably and slidably mounted upon said shafts, means of locking said bearing-blocks in position upon said shafts, an arm connecting said bearing-blocks and extending downwardly, a disk attached to said arm, a second disk placed against the lower face of the first disk, cultivator-tools attached to the second disk, and means of rotatably adjusting said second disk relative to the first disk, substantially as specified.

2. In a cultivator, a suitable frame, swivels carried by said frame, traction-wheels connected to said swivels and supporting the frame, means of operating said swivels to guide the traction-wheels, means of adjusting the distance between the traction-wheels, shafts extending forwardly from said frame in parallel positions, bearing-blocks rotatably and slidably mounted upon said shafts, an arm connecting said bearing-blocks and extending downwardly, a disk attached to said arm, a second disk placed against the lower face of the first disk, cultivator-tools attached to the second disk and means of rotatably adjusting said second disk relative to the first disk, substantially as specified.

3. In a cultivator, an arch-bar having vertically-alined bearings in each of its ends, posts rotatably mounted in said bearings, arms projecting backwardly from said posts, a connecting-rod connecting the rear ends of said arms, axles projecting from the lower ends of said posts, shafts extending forwardly from said arch-bar, bearing-blocks adjustably mounted upon said shafts, arms connecting said bearing-blocks and extending downwardly, disks attached to said arms, a second disk placed against the lower face of each of the first disks, cultivator-tools attached to the second disks, means for rotatably adjusting the said second disks relative to the first disks, substantially as specified.

4. In a cultivator, a suitable frame, traction-wheels supporting said frame, shafts extending forwardly from said frame, bearing-blocks mounted upon said shafts, arms extending downwardly from said bearing-blocks, disks attached to said arms, second disks placed against the lower face of the first disks, cultivator-tools attached to the second disks, arms extending rigidly upwardly from said shafts, segmental racks extending upwardly from said bearing-blocks beside said arms, and pins inserted through said arms and connecting said racks as required to adjust the cultivator-tools relative to a vertical line, substantially as specified.

5. In a cultivator, a shaft mounted parallel with the tongue, bearing-blocks rotatably and slidably mounted upon said shaft, an arm connecting said bearing-block and extending downwardly, a disk attached to said arm, a second disk placed against the lower face of the first disk, cultivator-tools attached to the second disk and means of rotatably adjusting said second disk relative to the first disk, substantially as specified.

6. In a cultivator, a shaft mounted parallel with the tongue, bearing-blocks mounted upon said shaft, means of adjusting said bearing-blocks upon said shaft, a segmental rack extending from one of said bearing-blocks, an arm extending from said shaft beside said segmental rack, a pin operating through said arm and engaging said rack as required to adjust the position of the rack relative to the arm, and cultivator-tools attached to said bearing-blocks, substantially as specified.

7. In a cultivator, an arch-bar having vertically-alined bearings in each end, posts slidably mounted in said bearings, levers pivotally connected to the upper ends of the said posts, chains connecting corresponding ends of said levers to said arch-bar, spools rotatably mounted, chains connecting the opposite ends of said levers to said spools, hand-wheels for operating said spools and pawl-and-ratchet mechanisms for holding said spools in the desired position, as required to raise and lower the arch-bar by manipulating the hand-wheels, substantially as specified.

8. In a cultivator, the combination of the laterally-adjustable arch, integral with the wheel-standards 6, with the means for supporting and adjusting the earthworking devises 33, consisting of the shafts having openings 24, and flattened extremities 25, the yoke-clevices 22 and 22', the extending arms 20, having openings 21, the horizontal arms 4 having openings 21', the plate 26 having openings 24', arms 27, and upwardly-extending sections 28 with openings therein, the castings 30 having upright arms 32, and the collar 35, all suitably secured by the pins 31, 31', 31'' and 31''', substantially as specified.

9. In a cultivator, having an adjustable frame, the combination of the guiding apparatus consisting of the wheel-standards 6, the arms 13, and the guide-bar 14, with the apparatus for raising and lowering said frame, consisting of chains 17 and 17', the hand-wheels 11, the spools 18, mounted on the shafts 19 carried by the supporting-arms 10, substantially as specified.

10. In a cultivator having an adjustable framework supporting a tongue 7, the combination of the shaft 23 having openings 24 and flattened ends 25 to enter the yoke-clevises 22 and 22', the yoke-clevises 22 and 22', carried by the extending arms 20, and the horizontal arms 4 of the frame, with the draft appliances, consisting of the doubletree 39 mounted upon the tongue 7, the chains 41 connecting it with the singletrees 40, and the singletrees 40 connected with the yoke-clevises 22 on a line with the shafts 23, by the chains 42, substantially as specified.

11. In a cultivator, the combination with a laterally-adjustable arch-bar having vertically-alined bearings in each of its ends, of the wheel-standards 6 rotatably and slidably mounted in said bearings, arms projecting backwardly from said standards, a connecting-rod connecting the rear ends of said arms, means of raising and lowering the arch-bar upon said standards, shafts extending forwardly from the arch-bar, bearing-blocks rotatably and slidably mounted upon said shafts, means of locking said bearing-blocks upon said shafts and cultivator-tools carried by said bearing-blocks, substantially as specified.

12. In a cultivator having a laterally and vertically adjustable frame, a means for guiding the same, and suitable draft appliances, the combination of the shafts 23, coupled to the yoke-clevises 22 and 22' and carrying collars 35 having the pins 31''', and the castings 30, having the upright arms 32 and the pins 31, with the means for supporting and adjusting the working tools 33, consisting of the plate 26 having upwardly-extending arms 27 encircling said shafts 23, the rear one of said arms on each shaft having an upwardly-extending section 28, provided with openings therein to receive pins 31', said plates also provided with openings 24' to receive pins 31" and a bolt 34 to secure said working tools, substantially as specified.

13. In a cultivator, the combination with the laterally-adjustable arch-bar having vertically-alined bearings in each of its ends of the standards 6 rotatably and slidably mounted in said bearings, arms projecting in parallel positions from said standards, a rigid connection between the free ends of said arms and means of raising and lowering said arch-bar upon said standards, substantially as specified.

14. In a cultivator, wherein the distance between the working tools may be regulated by the lateral movement of the traction-wheels, the combination with the tongue 7 of the clamp 8, controlled by the lever 47 and spring-dog 49 in connection with the rack-bar 50, for the purpose of clamping said tongue securely upon the arch-bar 1, substantially as specified.

15. In a cultivator, the combination with the laterally-adjustable frame, of the supporting-arms 10, carried upon the arch-bar 1, with the bars 10, having the braces 29 and 29' whereby the connected parts are held in their positions, substantially as specified.

CHARLES TANNER.

Witnesses:
LUDGER FRENCH,
D. T. STAFFORD.